United States Patent
Clark et al.

(10) Patent No.: US 10,785,445 B2
(45) Date of Patent: Sep. 22, 2020

(54) AUDIOVISUAL TRANSMISSIONS ADJUSTMENTS VIA OMNIDIRECTIONAL CAMERAS

(71) Applicant: Hewlett-Packard Development Company, L.P., Spring, TX (US)

(72) Inventors: Alexander Wayne Clark, Spring, TX (US); Kent E Biggs, Houston, TX (US); Michael James Pescetto, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/344,747

(22) PCT Filed: Dec. 5, 2016

(86) PCT No.: PCT/US2016/064934
§ 371 (c)(1),
(2) Date: Apr. 24, 2019

(87) PCT Pub. No.: WO2018/106211
PCT Pub. Date: Jun. 14, 2018

(65) Prior Publication Data
US 2019/0379861 A1 Dec. 12, 2019

(51) Int. Cl.
*H04N 7/14* (2006.01)
*G06T 7/593* (2017.01)
(Continued)

(52) U.S. Cl.
CPC ......... *H04N 7/147* (2013.01); *G06K 9/00228* (2013.01); *G06K 9/00335* (2013.01);
(Continued)

(58) Field of Classification Search
CPC ...... H04N 7/147; H04N 7/142; H04N 13/204; G06K 9/00335; G06K 9/00228;
(Continued)

(56) References Cited

U.S. PATENT DOCUMENTS 7,440,615 B2   10/2008   Gong et al.
8,355,041 B2   1/2013    Chen et al.
(Continued)

FOREIGN PATENT DOCUMENTS

CN   101577795   11/2009

OTHER PUBLICATIONS

Skype for Business Conference Phones, 2016, http://www.polycom.co.in/content/www/en/products-services/products-for-microsoft/conference-phones-skype-for-business/conference-phones.html.
(Continued)

*Primary Examiner* — Stella L. Woo
(74) *Attorney, Agent, or Firm* — HP Inc. Patent Department

(57) ABSTRACT

In one example method, a computing device scans an environment via an omnidirectional camera, detects objects in the environment, and captures depth information of the environment and the objects in the environment via 3D imaging of the omnidirectional camera. The computing device makes adjustments to audiovisual (AV) transmissions based on the detected objects and the depth information captured of the environment and the objects.

20 Claims, 3 Drawing Sheets

(51) Int. Cl.
*H04N 13/204* (2018.01)
*G06K 9/00* (2006.01)

(52) U.S. Cl.
CPC ............ *G06T 7/593* (2017.01); *H04N 7/142* (2013.01); *H04N 13/204* (2018.05); *G06T 2207/10028* (2013.01); *G06T 2207/30201* (2013.01)

(58) Field of Classification Search
CPC ........... G06T 7/593; G06T 2207/30201; G06T 2207/10028
See application file for complete search history.

(56) References Cited

U.S. PATENT DOCUMENTS

| | | | |
|---|---|---|---|
| 8,976,224 B2 | 3/2015 | Smith et al. | |
| 2004/0240741 A1 | 12/2004 | Aliaga et al. | |
| 2006/0187305 A1 | 8/2006 | Trivedi et al. | |
| 2011/0025819 A1* | 2/2011 | Gorzynski | H04N 7/147 348/14.07 |
| 2011/0164141 A1* | 7/2011 | Tico | G06T 7/246 348/207.99 |
| 2011/0316963 A1* | 12/2011 | Li | H04N 7/15 348/14.1 |
| 2012/0314015 A1* | 12/2012 | Watson | H04N 7/15 348/14.1 |
| 2014/0176663 A1* | 6/2014 | Cutler | G06T 7/50 348/14.07 |
| 2014/0365620 A1* | 12/2014 | Lindberg | H04L 65/60 709/219 |
| 2015/0022636 A1* | 1/2015 | Savransky | H04R 3/00 348/46 |
| 2015/0049162 A1* | 2/2015 | Kurupacheril | H04N 7/15 348/14.08 |
| 2015/0054974 A1 | 2/2015 | Ehmann | |
| 2016/0050394 A1 | 2/2016 | Segal | |
| 2016/0295197 A1* | 10/2016 | Hudman | G06F 3/16 |
| 2016/0379660 A1* | 12/2016 | Wright | H04S 1/002 381/57 |

OTHER PUBLICATIONS

TeleHuman: Effects of 3D perspective on gaze and pose estimation with a life-size cylindrical telepresence pod, Jan. 2012 < http://www.researchgate.net/publication/254005115_.

* cited by examiner

AUDIOVISUAL TRANSMISSIONS ADJUSTMENTS VIA OMNIDIRECTIONAL CAMERAS

BACKGROUND

Collaborative workspaces are inter-connected environments in which participants in dispersed locations can interact with each other. Improvements in processing capabilities and the widespread availability of high speed internet allow for synchronous communications between the participants at the various locations.

DETAILED DESCRIPTION

Examples of synchronous communications include, but are not limited to, voice and video services. As an example, a first location, such as a conference room, may include cameras that transmit video images from that location to the other locations, for example, where remote participants reside. Similarly, the dispersed locations may include cameras that transmit video images to the other locations. As a result, the participants at the various locations may be able to have a face to face conversation with each other. Similarly, the conference room and the dispersed locations may include microphones to transmit audio between the locations. Although the voice and video services may provide the ability for participants at the various locations to connect with each other, there may be a lack of collaboration or inclusiveness between the participants. As an example, there may be distractions, audio and/or visual, on the feeds transmitted between the various locations, which may reduce collaboration between the participants.

Examples disclosed herein provide for the use of 360 degrees of 3D cameras when performing synchronous communications between participants at various locations, which allow for greater collaboration and a feeling of inclusiveness between the participants. Rather than feeling disconnected, synchronous communications, such as voice and video services, provided by omnidirectional cameras like 360 degrees of 3D cameras, may provide the impression that the participants at the various locations are all together at a common location. As will be further described, omnidirectional cameras may enable features such as background removal, gesture control, depth sensing, and object detection.

Figure 1:
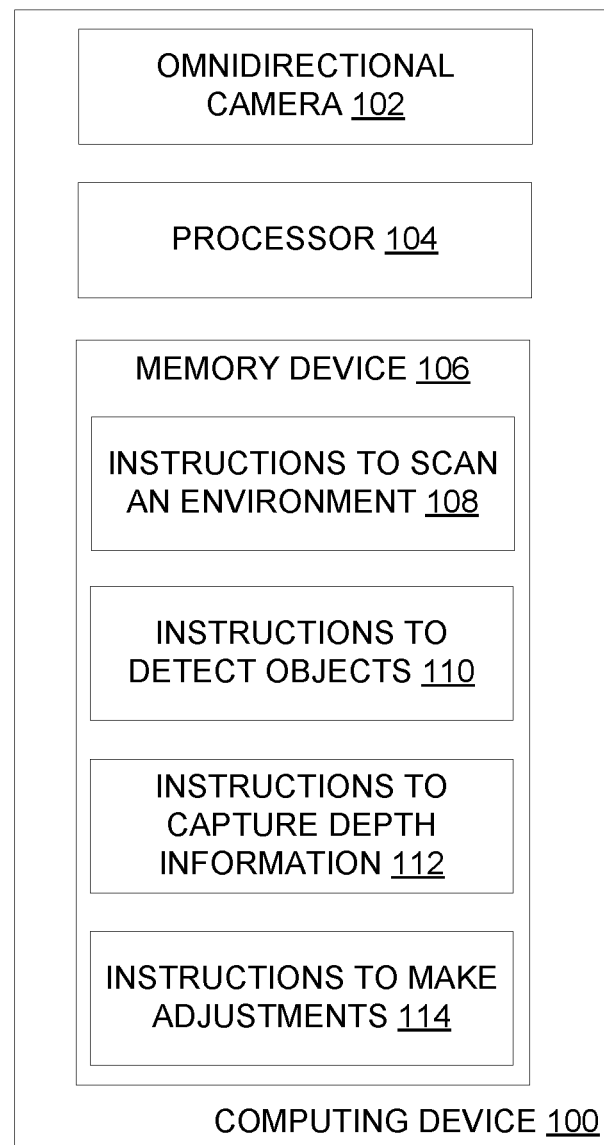
FIG. 1 illustrates a computing device that may be used at a location for performing synchronous communications with participants at other locations, according to an example.

With reference to the figures, FIG. 1 illustrates a computing device 100 that may be used at a location for performing synchronous communications with participants at other locations, according to an example. As illustrated, the computing device 100 includes an omnidirectional camera 102 for capturing the full view of an environment, and not just a rectangular viewpoint. As an example, the omnidirectional camera 102 corresponds to 360 degrees of 3D cameras. By using 3D cameras, a 3D camera of the omnidirectional camera 102 may be able to collect depth information of its environment and any objects detected. Similarly, by using 360 degrees of 3D cameras, the omnidirectional camera 102, with a 360 degree field of view, may be able to collect depth information of the whole environment that the omnidirectional camera 102 is in.

Implementations of the 360 degrees of 3D cameras may vary. For example, multiple 3D camera may be arranged in a circle, facing outwards, or even two 180 degree 3D cameras back to back. Imaging captured by each of these cameras may be stitched together in a 360 degree panoramic feed. As an example, the number of 3D cameras required for the full view depends on the viewing angle of each individual 3D camera. As will be further described, the imaging captured by the omnidirectional camera 102 may enable features such as background removal, gesture control, depth sensing, and object detection. As an example, the omnidirectional camera 102 may be incorporated into the computing device 100, or may be connected to the computing device 100, for example, via a wired or wireless connection.

The computing device 100 depicts a processor 104 and a memory device 106 and, as an example of the computing device 100 performing its operations, the memory device 106 may include instructions 108-114 that are executable by the processor 104. Thus, memory device 106 can be said to store program instructions that, when executed by processor 104, implement the components of the computing device 100. The executable program instructions stored in the memory device 106 include, as an example, instructions to scan an environment (108), instructions to detect objects (110), instructions to capture depth information (112), and instructions to make adjustments (114).

Instructions to scan an environment (108) represent program instructions that when executed by the processor 104 cause the computing device 100 to scan, via the omnidirectional camera 102, the environment that the computing device 100 is in (or the omnidirectional camera 102 is in if it is in a different location from the computing device 100). As an example, while scanning, the omnidirectional camera 102 may captures images or videos of the 360 degree panoramic view of the environment that the computing device 100 is in.

Instructions to detect objects (110) represent program instructions that when executed by the processor 104 cause the computing device 100 to detect objects in the environment scanned by the omnidirectional camera 102. As an example, each image or frame of captured video may be processed using object detection algorithms for detecting the objects in the environment of the computing device 100. In order to address privacy concerns of the omnidirectional camera 102 capturing the environment around the computing device 100, the object detection algorithms may analyze the images for objects upon capture, and then delete the images, rather than saving or storing them to be analyzed later. As a result, the only data captured are the types of objects detected via the object detection algorithms.

As an example, in addition to detecting objects, the computing device may determine whether the objects detected correspond to human faces. For example, each image or frame of captured video may be processed using object detection algorithms for determining whether there are faces captured in the images. The object detection algorithms may correspond to facial detection algorithms for identifying the objects in the environment as faces of users.

Instructions to capture depth information (112) represent program instructions that when executed by the processor 104 cause the computing device 100 to capture depth information of the environment and the objects in the environment via the 3D imaging of the omnidirectional camera 102. By using the depth sensing capabilities of the 360 degrees of 3D cameras, the omnidirectional camera 102 may be able to scan and assess the size and shape of the environment that the computing device 100 is housed in (e.g., the size and shape of a conference room that the computing device 100 is housed in), and the depth information of the objects detected, including any users. Knowing the size, position, and shape of the environment, including information concerning the objects detected, may allow for the computing device 100 to utilize features such as background removal, gesture control, depth sensing, and object detection, as will be further described.

Instructions to make adjustments (114) represent program instructions that when executed by the processor 104 cause the computing device 100 to make adjustments to audiovisual (AV) transmissions, based on the detected objects and the depth information captured of the environment and the objects. As an example, the AV transmissions may correspond to the voice and video services being held between participants at various locations, as described above. For example, a conference room may include the computing device 100 with the omnidirectional camera 102 for transmitting AV transmissions to other locations, for example, where remote participants reside. As will be further described (e.g., see FIG. 2), the adjustments made to the AV transmissions, based on the detected objects in the conference room, and the depth information captured of the environment and the objects, may allow for greater collaboration and a feeling of inclusiveness between the participants, by at least reducing audio and/or video distractions.

As an example, in addition to making adjustments to AV transmissions, the computing device 100 may detect gestures to be performed by users detected via the omnidirectional camera 102. The 360 degree panoramic feed provided by the omnidirectional camera 102 gives 360 degree gesture control to everyone in the environment of the computing device 100 (e.g., the conference room), granting everyone in the conference room equal and simultaneous access to controls of the voice and video services. Examples of 360 degree gesture control include: motioning to the left or right to adjust a camera; raising or lowering the volume (or muting) of a speakerphone without having to lean over to press a button. Gesture controls may also apply to other devices in the same environment as the computing device 100, such as a projector screen (i.e., raising or lowering the screen).

Memory device 106 represents generally any number of memory components capable of storing instructions that can be executed by processor 104. Memory device 106 is non-transitory in the sense that it does not encompass a transitory signal but instead is made up of at least one memory component configured to store the relevant instructions. As a result, the memory device 106 may be a non-transitory computer-readable storage medium. Memory device 106 may be implemented in a single device or distributed across devices. Likewise, processor 104 represents any number of processors capable of executing instructions stored by memory device 106. Processor 104 may be integrated in a single device or distributed across devices. Further, memory device 106 may be fully or partially integrated in the same device as processor 104, or it may be separate but accessible to that device and processor 104.

In one example, the program instructions 108-114 can be part of an installation package that when installed can be executed by processor 104 to implement the components of the computing device 100. In this case, memory device 106 may be a portable medium such as a CD, DVD, or flash drive or a memory maintained by a server from which the installation package can be downloaded and installed. In another example, the program instructions may be part of an application or applications already installed. Here, memory device 106 can include integrated memory such as a hard drive, solid state drive, or the like.

Figure 2:
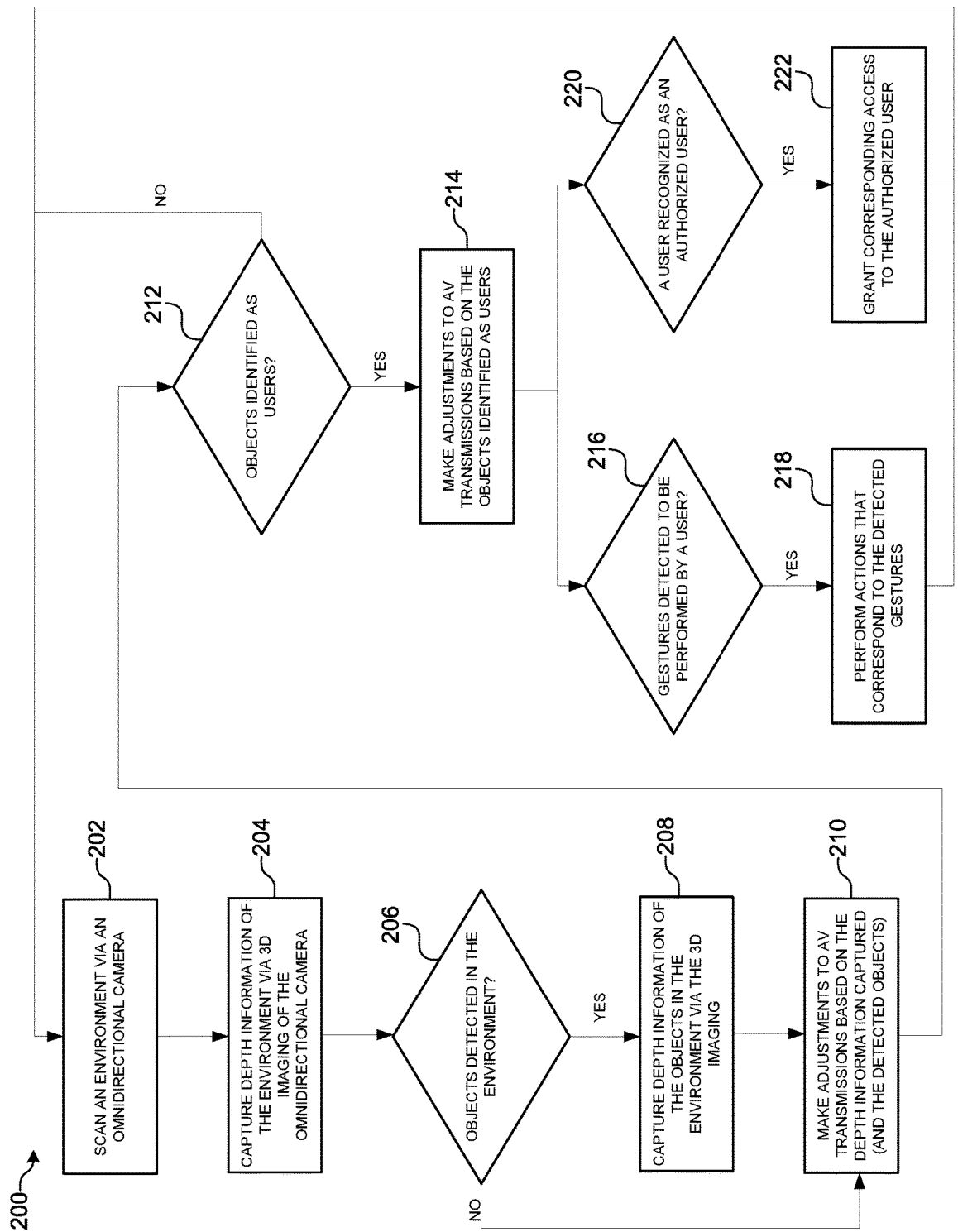
FIG. 2 illustrates a method of operation at a computing device for performing synchronous communications, such as voice and video services, between participants at various locations, according to an example.

FIG. 2 illustrates a method 200 of operation at a computing device for performing synchronous communications, such as voice and video services, between participants at various locations, according to an example. As an example, method 200 is described with reference to computing device 100.

Method 200 begins at 202, where the computing device 100, via the omnidirectional camera 102, scan an environment that the computing device 100 is in (or the omnidirectional camera 102 is in if it is in a different location from the computing device 100). Referring to the example above, the omnidirectional camera 102 may scan the conference room that the computing device 100 is disposed in. As an example, while scanning, the omnidirectional camera 102 may captures images or videos of the 360 degree panoramic view of the conference room.

At 204, the omnidirectional camera 102 may capture depth information of the environment via 3D imaging of the omnidirectional camera 102. By using the depth sensing capabilities of the 360 degrees of 3D cameras, the omnidirectional camera 102 may be able to scan and assess the size and shape of the conference room.

At 206, the computing device 100 may determine whether objects are detected in the environment (e.g., the conference room). As an example, each image or frame of captured video may be processed using object detection algorithm for detecting the objects in the environment of the computing device 100. If objects are detected in the environment, at 208, the omnidirectional camera 102 captures depth information of the objects in the environment via the 3D imaging. Otherwise, operations continue at 210.

At 210, the computing device 100 makes adjustments to the AV transmissions, based on the detected objects (if any) and the depth information captured of the environment and any detected objects. As an example, the AV transmissions may correspond to the voice and video services being held between participants in the conference room and at various locations, as described above. As will be further described, the adjustments made to the AV transmissions, based on the detected objects in the conference room (if any), and the depth information captured of the environment and the detected objects, may allow for greater collaboration and a feeling of inclusiveness between the participants, by at least reducing audio and/or video distractions.

At 212, the computing device may determine whether the objects detected by the omnidirectional camera 102 are users. For example, each image or frame of captured video may be processed using object detection algorithms for determining whether there are faces captured in the images. The object detection algorithms may correspond to facial detection algorithms for identifying the objects in the environment as faces of users. At 214, the computing device 100 may make adjustments to the AV transmissions based on the objects detected as users.

With the ability for 3D cameras to capture depth information, the computing device 100 may be able to utilize such information to customize video transmissions captured by the 360 degrees of 3D cameras of the omnidirectional camera 102 prior to transmitting to participants at other locations. Examples of customizing video transmissions include background removal and eliminating wasted space in a video feed. With regards to background removal, by capturing the depth information of the environment, the computing device may be able to differentiate between a foreground and a background of the environment. As the foreground is likely to contain relevant information that should be transmitted in the video feed, the background may, at times, contain information that is sensitive or undesirable information that may be a distraction for participants at other locations to view. As a result, the computing device 100 may make adjustments to the AV transmissions by removing the background of the environment from the AV transmissions that is transmitted to the participants at the other locations. The amount of background information removed from the AV transmissions may vary, or be controlled by a user. Examples of background that may be a distraction in a video feed may be people walking by or sensitive information that may be desired to be hidden (e.g., whiteboard drawings or schematics that are not intended to be seen by the participants at the other locations).

With regards to eliminating wasted space, as users may be dispersed in an environment that is captured by the omnidirectional camera 102, for example, around a table in a conference room, as the omnidirectional camera 102 is angled to take in a full view of the conference room, there may be wasted space in between the users sitting around various parts of the table. By detecting this wasted space, the wasted space may be eliminated, and the images of the users in the room may be brought closer together by stitching their video feeds into one, more closely adjoined image. Similarly, if the users are detected (e.g., at 212), the space in between the users may be eliminated, resulting in the same stitched video of the users closer together. As a result, two users sitting on opposite sides of the table may appear closer together, making it easier for participants at other locations to see everyone in the adjusted AV transmission.

In addition to customizing video transmissions captured by the 360 degrees of 3D cameras of the omnidirectional camera 102, the depth information of the environment as captured by the 3D cameras may be used to optimize acoustics in the environment that the computing device 100 is disposed in, to customize audio transmissions transmitted to participants at other locations, and even to provide feedback to other devices to make adjustments. With regards to optimizing acoustics in the environment that the computing device is disposed in (e.g., the conference room), the computing device 100 may acoustically adjust the audio of its speakers to fit the size of the environment that the computing device 100 is in (e.g., the conference room), and minimize unwanted echoes or reflections.

With regards to customizing audio transmissions transmitted to participants at other locations, a sensitivity of microphones of the computing device 100 may be adjusted, based on the depth information captured of any users detected by the omnidirectional camera 102. For example, the 3D cameras could determine the location of any detected users with respect to the microphones or speakerphone. Upon detecting the location of the detected users, or another audio source in the conference room, the microphones may use beamforming technology to selectively boost the input audio, in order to properly process any sounds received. Similarly, the microphones may use beamforming technology to selectively mute any areas of the conference room that do not have any detected users, in order to cut down on overall noise pollution of the audio.

With regards to providing feedback to other devices to make adjustments, the computing device 100 may provide feedback to other devices that are in the same environment as the computing device 100, such as the conference room. For example, the computing device 100, upon capturing the depth information of the conference room, may provide feedback to a projector in the conference room, to automatically keystone to the correct perspective of the wall or screen of the conference room that the projector is projecting on.

At 216, in addition to making adjustments to AV transmissions at 210 and 214, the computing device 100 may detect gestures to be performed by users detected via the omnidirectional camera 102. The 360 degree panoramic feed provided by the omnidirectional camera 102 gives 360 degree gesture control to everyone in the environment of the computing device 100 (e.g., the conference room), granting everyone in the conference room equal and simultaneous access to controls of the voice and video services. At 218, if gestures are detected, the computing device performs actions corresponding to the detected gestures. Examples of 360 degree gesture control include: motioning to the left or right to adjust a camera; raising or lowering the volume (or muting) of a speakerphone without having to lean over to press a button.

At 220, in addition to using facial detection to identify whether objects detected correspond to human faces, which may be sufficient for providing gesture control (e.g., at 216), facial recognition algorithms may be used by the computing device 100 for granting access to a limited number of users where authorization may be required. For example, if the leader/organizer of a meeting is recognized by the omnidirectional camera 102, the leader can be given the ability to activate controls or access documents. Facial recognition from the omnidirectional camera 102 may increase collaboration, allowing for multiple users to be simultaneously identified or logged into the computing device 100. With regards to conference call, with the ability to recognize individual faces, the video feed could label participants in the conference room, or even list them in the call. Facial recognition could also be used as authentication data for providing access to files from cloud services, in a more immersive, collaborative setting. At 222, once a user is recognized as an authorized user, the computing device 100 may grant corresponding access to the authorized user.

Figure 3:
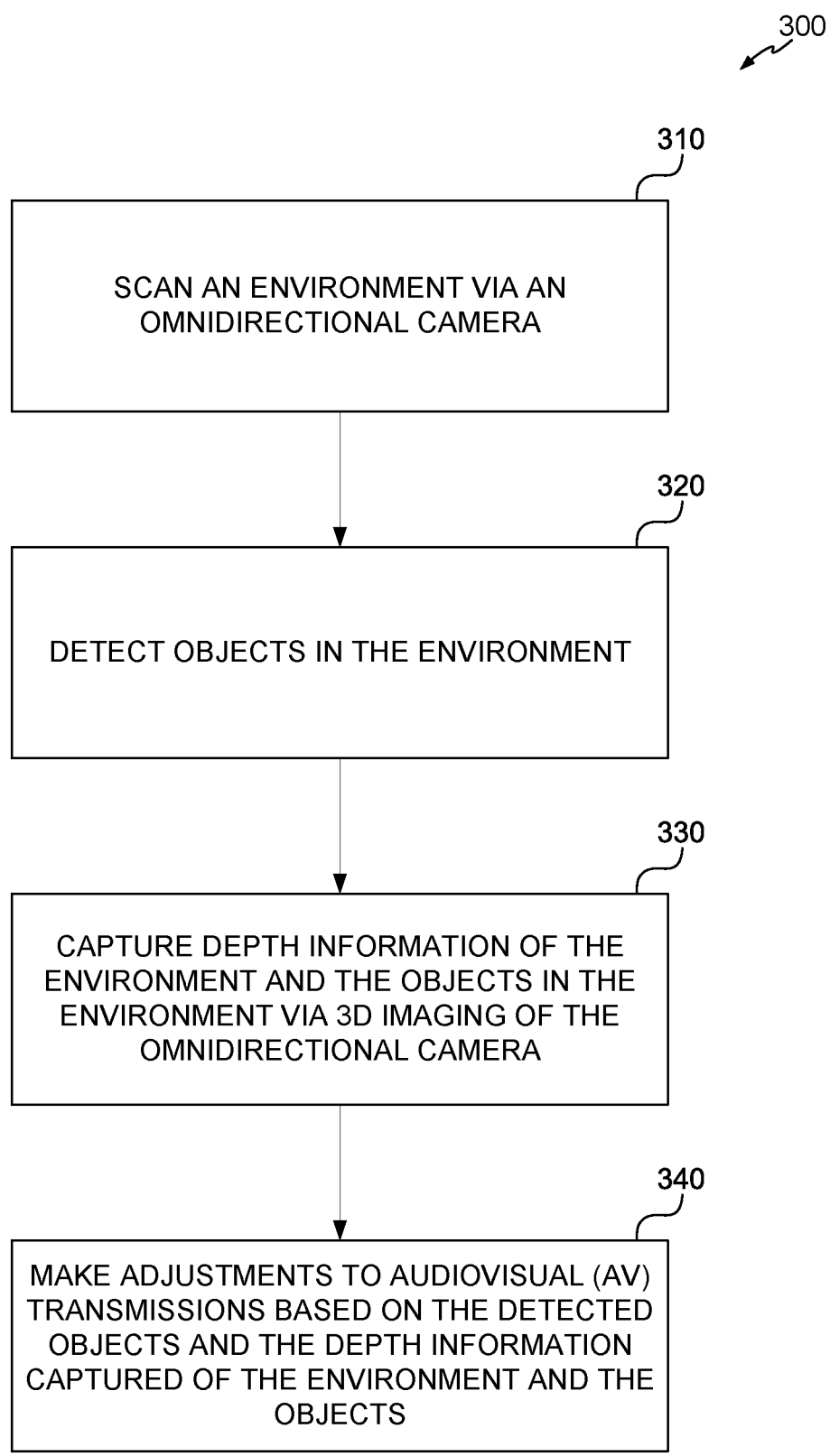
FIG. 3 is a flow diagram in accordance with an example of the present disclosure.

FIG. 3 is a flow diagram 300 of steps taken by a computing device to implement a method for performing synchronous communications, such as voice and video services, between participants at various locations, according to an example. In discussing FIG. 3, reference may be made to the example computing device 100 illustrated in FIG. 1. Such reference is made to provide contextual examples and not to limit the manner in which the method depicted by FIG. 3 may be implemented.

At 310, the computing device scans an environment via an omnidirectional camera of the computing device. As an example, while scanning, the omnidirectional camera may captures images or videos of the 360 degree panoramic view of the environment that the computing device is in (e.g., conference room).

At 320, the computing device detects whether there are objects in the environment. As an example, each image or frame of captured video may be processed using object detection algorithms for detecting the objects in the environment of the computing device. As an example, the computing device may use facial detection to identify whether objects in the environment are user, for example, by detecting human faces.

At 330, the computing device captures depth information of the environment and any detected objects in the environment via 3D imaging of the omnidirectional camera. By using the depth sensing capabilities of the 360 degrees of 3D cameras, the omnidirectional camera may be able to scan and assess the size and shape of the environment that the computing device is housed in (e.g., the size and shape of a conference room that the computing device is housed in), and the depth information of the objects detected, including any users.

At 340, the computing device makes adjustments to AV transmissions, based on any detected objects and the depth information captured of the environment and any detected objects. As an example, the computing device may correct visual distortions captured by the omnidirectional camera, wherein the correction are to be based on the depth information of the environment. As an example, the computing device may adjust audio transmissions to fit the environment, wherein the adjustments to the audio transmissions are to be based on the depth information of the environment. The computing device may also provide feedback to other devices, to make adjustments based on the captured depth information of the environment.

As an example, by capturing depth information of the environment, the computing device may be able to differentiate between a foreground and a background of the environment. As a result, the computing device may be able to make adjustments to the AV transmissions by removing at least a portion of the background of the environment from the AV transmissions, or replacing with another background.

If objects in the environment are detected as users, the computing device may be able to provide additional controls. For example, the computing device may be able to make adjustments to the AV transmissions by eliminating video feeds in the AV transmissions between the users, and then stitching video feeds in the AV transmissions of the users together. In addition, the computing device detect whether gestures are performed by the users, and perform such actions that correspond to the detected gestures. As an example, the computing device may adjust audio transmissions based on the depth information captured of the users. Upon detecting the location of the detected users, or another audio source in the environment (e.g., conference room), the microphones may use beamforming technology to selectively boost the input audio, in order to properly process any sounds received. Similarly, the microphones may use beamforming technology to selectively mute any areas of the conference room that do not have any detected users, in order to cut down on overall noise pollution of the audio.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method performed by a system comprising a hardware processor, comprising:
   receiving three-dimensional (3D) image data based on a scan of an environment captured by an omnidirectional camera;
   detecting objects in the environment;
   determining depth information of the environment and the objects in the environment based on the 3D image data; and
   making adjustments to audiovisual (AV) transmissions based on the detected objects and the depth information of the environment and the objects, wherein making the adjustments to the AV transmissions comprises adjusting audio transmissions based on depth information captured of users identified from the objects, the adjusting of the audio transmissions comprising adjusting a sensitivity of a microphone in the environment according to a location of a first user of the users relative to the microphone.

2. The method of claim 1, wherein:
   determining the depth information of the environment comprises differentiating between a foreground and a background of the environment, and
   making the adjustments to the AV transmissions comprises removing the background of the environment from the AV transmissions.

3. The method of claim 1, comprising:
   using facial detection to identify the users,
   wherein making the adjustments to the AV transmissions comprises:
   eliminating video feeds in the AV transmissions between the users; and
   stitching together video feeds in the AV transmissions of the users.

4. The method of claim 3, comprising:
   detecting gestures of the users; and
   adjusting the AV transmissions based on the detected gestures.

5. The method of claim 1, wherein making the adjustments to the AV transmissions comprises adjusting the audio transmissions to fit the environment.

6. The method of claim 1, wherein making the adjustments to the AV transmissions comprises correcting, based on the depth information of the environment, visual distortions captured by the omnidirectional camera.

7. The method of claim 1, comprising:
   providing feedback to other devices to make adjustments based on the depth information of the environment.

8. The method of claim 1, further comprising:
identifying, by the system, a given user of the users as a person with a specified authorization to activate a control relating to a communication session among participants at different locations; and
in response to a gesture of the given user, controlling, by the system, a device used in the communication session.

9. The method of claim 8, wherein the controlling of the device comprises adjusting, by the system, a position of a camera.

10. The method of claim 8, wherein the controlling of the device comprises adjusting, by the system, a volume of a speaker.

11. A computing device comprising:
an omnidirectional camera;
a processor; and
a non-transitory storage medium storing instructions executable on the processor to:
receive three-dimensional (3D) image data based on a scan of an environment captured by the omnidirectional camera;
detect objects in the environment;
determine depth information of the environment and the objects in the environment based on the 3D image data;
use facial detection to identify users in the objects in the environment;
detect gestures of the users; and
responsive to the gestures, make adjustments to audiovisual (AV) transmissions based on the detected objects and the depth information of the environment and the objects, wherein the adjustments to the AV transmissions comprise adjusting audio transmissions based on depth information captured of the users, the adjusting of the audio transmissions comprising adjusting a sensitivity of a microphone in the environment according to a location of a first user of the users relative to the microphone.

12. The computing device of claim 11, wherein the instructions are executable on the processor to determine the depth information of the environment based on differentiating between a foreground and a background of the environment, and
the instructions are executable on the processor to make the adjustments to the AV transmissions by removing the background of the environment from the AV transmissions.

13. The computing device of claim 11, wherein the instructions are executable on the processor to make the adjustments to the AV transmissions by:
eliminating video feeds in the AV transmissions between the users; and
stitching together video feeds in the AV transmissions of the users.

14. The computing device of claim 11, wherein the instructions are executable on the processor to adjust the audio transmissions to fit the environment.

15. A non-transitory computer-readable storage medium comprising instructions that when executed cause a system to:
receive three-dimensional (3D) image data based on a scan of an environment captured by an omnidirectional camera;
detect objects in the environment;
determine depth information of the environment and the objects in the environment based on the 3D image data;
make adjustments to audiovisual (AV) transmissions based on the detected objects and the depth information of the environment and the objects, wherein the instructions to make the adjustments to the AV transmissions cause the system to adjust audio transmissions based on depth information captured of users identified from the objects, the adjusting of the audio transmissions comprising adjusting a sensitivity of a microphone in the environment according to a location of a first user of the users relative to the microphone; and
provide feedback to other devices to make adjustments based on the depth information of the environment.

16. The non-transitory computer-readable storage medium of claim 15, wherein the instructions to make the adjustments to the AV transmissions cause the system to adjust the audio transmissions to fit the environment.

17. The non-transitory computer-readable storage medium of claim 15, wherein the instructions to make the adjustments to the AV transmissions cause the system to correct, based on the depth information of the environment, visual distortions captured by the omnidirectional camera.

18. The non-transitory computer-readable storage medium of claim 15, wherein the instructions when executed cause the system to:
identify a given user of the users as a person with a specified authorization to activate a control relating to a communication session among participants at different locations; and
in response to a gesture of the given user, control a device used in the communication session.

19. The non-transitory computer-readable storage medium of claim 18, wherein the controlling of the device comprises adjusting a position of a camera.

20. The non-transitory computer-readable storage medium of claim 18, wherein the controlling of the device comprises adjusting a volume of a speaker.

* * * * *